(12) United States Patent
Baba et al.

(10) Patent No.: US 6,605,389 B2
(45) Date of Patent: Aug. 12, 2003

(54) ALKALINE STORAGE BATTERY AND METHOD OF MANUFACTURING THE SAME

(75) Inventors: Yoshitaka Baba, Tokushima (JP); Motoo Tadokoro, Itano-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 158 days.

(21) Appl. No.: 09/812,696

(22) Filed: Mar. 21, 2001

(65) Prior Publication Data
US 2001/0033969 A1 Oct. 25, 2001

(30) Foreign Application Priority Data
Mar. 23, 2000 (JP) .................... P. 2000-082013

(51) Int. Cl.$^7$ ............................... H01M 4/32
(52) U.S. Cl. ............ 429/223; 429/209; 429/218.1
(58) Field of Search .................. 429/209, 218.1, 429/223

(56) References Cited

U.S. PATENT DOCUMENTS 6,218,046 B1 * 4/2001 Tanigawa et al. ........... 429/223
6,399,247 B1 * 6/2002 Kitayama et al. ........... 429/223

FOREIGN PATENT DOCUMENTS

JP          1200555          8/1989

* cited by examiner

Primary Examiner—Carol Chaney
Assistant Examiner—Dah-Wei D. Yuan
(74) Attorney, Agent, or Firm—Nixon & Vanderhye P.C.

(57) ABSTRACT

An alkaline storage battery includes a positive electrode active material containing nickel hydroxide as a main component. A part of the surface of the nickel hydroxide is unevenly covered with a cobalt compound having an average oxidation number of larger than +2 and containing alkaline cations. Since only a part of the surface of the nickel hydroxide is covered with the cobalt compound, the nickel hydroxide not covered with the cobalt compound is brought into direct contact with the electrolyte, thus improving the high rate discharging characteristic. Since a part of the surface of the nickel hydroxide is covered with the high-order cobalt compound containing alkaline cations, the high-order cobalt compound with high conductivity produces a highly conductive network within the positive electrode so that the rate of using the active material is improved. In this configuration, the alkaline storage battery with high capacity and excellent high rate discharging characteristic can be provided by using a nickel hydroxide active material which permits nickel hydroxide to be brought into direct contact with an electrolyte regardless with high order cobalt oxide on the surface of nickel hydroxide.

12 Claims, 1 Drawing Sheet

ALKALINE STORAGE BATTERY AND METHOD OF MANUFACTURING THE SAME

BACKGROUND OF THE INVENTION

1. Field of the Invention

This invention relates to an alkaline storage battery such as a nickel-metal hydride (Ni—MH) storage battery, a nickel-cadmium (Ni—Cd) storage battery, and nickel-zinc (Ni—Zn) storage battery using nickel hydroxide as a positive electrode active material, and more particularly to an alkaline storage battery using nickel hydroxide active material containing a cobalt compound as a conductive auxiliary agent and a method of manufacturing it.

2. Description of the Related Art

In recent years, owing to rapid spreading of portable electronic/communication appliances, a high-capacity high-performance storage battery has been demanded more eagerly than before. Under such a circumstance, in the field of the alkaline storage battery using nickel hydroxide as a positive electrode active material, in order to facilitate the high performance of the storage battery, various proposals of improvement of the active material of a nickel positive electrode have been made. For example, it has been generally carried out to add a small quantity of the cobalt compound serving as a conductive auxiliary agent to nickel hydroxide which is a main component of the positive electrode.

However, only adding the cobalt compound serving as the conductive auxiliary agent cannot provide a high-capacity high-performance storage battery. Therefore, as a technique for accelerating the high capacity and high performance of the storage battery, the inventors of this invention have proposed in JP No. 2,589,123 an alkaline heat treatment method of coating a surface of nickel hydroxide with the cobalt compound and heating it within an atmosphere containing both alkaline solution and oxygen.

In the method proposed in JP No. 2,589,123, when the cobalt compound is heated in the atmosphere containing both alkaline solution and oxygen, highly conductive high-order (an average oxidation number of larger than +2)cobalt oxide is created so that the rate of using an active material is improved to realize the high-capacity and high-performance of the battery.

However, the presence of the high-order cobalt oxide on the surface of nickel hydroxide has presented a problem that the cobalt compound which does not directly participate in the reaction exists uniformly on the surface of the nickel hydroxide to impede contact of the nickel hydroxide with an electrolyte so that the high rate discharging characteristic attenuates.

Further, the high-order cobalt oxide created on the surface of nickel hydroxide is created in such a manner that a cobalt compound is first precipitated from a nucleus of a part of the compound on the surface of nickel hydroxide, and it is heat-treated in an atmosphere containing both alkali solution and oxygen. Therefore, the trace when the cobalt compound has been precipitated from a nucleus of a part of the compound on the surface remains as it is, which results in the high-order cobalt oxide. Accordingly, owing to the resultant attenuation of "smooth", the electrode cannot be densely filled with the active material so that the battery with high capacity and high-performance cannot be realized.

SUMMARY OF THE INVENTION

This invention has been accomplished in order to overcome the inconvenience as described above.

An object of this invention is to provide an alkaline storage battery which provides high capacity and excellent high rate discharging characteristic by acquiring a nickel hydroxide active material which permits nickel hydroxide to be brought into direct contact with an electrolyte regardless with high-order cobalt oxide on the surface of nickel hydroxide.

In order to attain the above object, the alkaline storage battery according to this invention includes a positive electrode active material containing a nickel hydroxide compound as a main component. A part of the surface of the nickel hydroxide compound is unevenly covered with a high-order cobalt compound containing alkaline cations.

Since a part of the surface of the nickel hydroxide is unevenly covered with the high-order cobalt compound containing alkaline cations, the high-order cobalt compound with high conductivity produces a highly conductive network within the positive electrode so that the rate of using the active material is improved, thereby providing a high capacity storage battery. In this case, since only a part of the surface of the nickel hydroxide is unevenly covered with the cobalt compound so that it exposed, the nickel hydroxide not covered with the cobalt compound is brought into direct contact with the electrolyte, thus preventing the high rate discharging characteristic from being deteriorated. Thus, the alkaline storage battery with high capacity and excellent high rate discharging characteristic can be provided.

The method of manufacturing an alkaline storage battery includes: a covering step of covering a surface of a granulated nickel hydroxide compound containing the nickel hydroxide as a main component with a cobalt compound; an alkaline heat treatment step of alkaline-heat-treating the nickel hydroxide compound covered with the cobalt compound so that the cobalt compound is changed into a high-order cobalt compound containing alkaline cations; and an eluting step of making the nickel hydroxide compound covered with the high-order cobalt compound containing the alkaline cations in contact with or immersion in an acid water solution so that a part of the high-order cobalt compound is eluted.

In this way, when the surface of the nickel hydroxide compound is covered with the high-order cobalt compound and thereafter brought into contact with or immersed within the acid water solution, a part of the high-order cobalt compound on the outermost surface of the nickel hydroxide active material is eluted into the hydrochloric acid solution. Thus, the high-order cobalt compound containing alkaline cations is partially left on the surface of the nickel hydroxide compound. Using such an active material, a nickel electrode is made. Using this nickel electrode, an alkaline storage battery is manufactured. In this case, since the nickel hydroxide is brought into direct contact with an alkaline electrolyte with the battery, the high rate discharging characteristic can be improved.

In the covering step, the cobalt compound is precipitated from a nucleus on the surface of the nickel hydroxide compound. Further, in the alkaline heat treatment step, the cobalt compound is changed into the high-order cobalt compound. Therefore, upon completion of the alkaline heat treatment step, an uneven shape is formed on the nickel hydroxide compound is formed. Thereafter, the nickel hydroxide compound is brought into contact with or immersed in the acid water solution. In this case, the portion of the uneven shape is apt to be eluted so that it is smoothed. Thus, the nickel hydroxide compound with a part of the surface covered with the high-order cobalt compound containing alkaline cations can be densely filled into an electrode substrate, thereby realizing the high capacity of the battery.

Additionally, the covering step comprises a step of adding a water solution containing cobalt ions into a solution with granulated hydroxide nickel precipitated so that cobalt hydroxide is precipitated around a crystalline nucleus of a spherical hydroxide particle containing nickel hydroxide as a main component.

Further, the water solution containing the cobalt ions is preferably a water solution of cobalt sulfate.

Further, the covering step comprises a step of controlling pH of the solution so as to precipitates (segregate) the cobalt hydroxide. Preferably, pH of the solution is 9~10. This facilitates the coverage.

Further, preferably, the alkaline heat treatment step is to spray alkaline solution onto the nickel hydroxide compound covered with the cobalt compound within an atmosphere of oxygen.

Furthermore, preferably, the alkaline-heat-treatment is carried out at a temperature ranging from 50° C. to 110° C.

Moreover, preferably, the alkaline-heat-treatment step is to spray alkaline solution containing sodium hydroxide.

Incidentally, the acid water solution for eluting the high-order cobalt compound does not provides any particular difference in the elution effect as long as it is acid. However, it is desired to be hydrochloric acid solution, sulfuric acid solution, acetic acid solution, etc.

The above and other objects and features of this invention will be more apparent from the following description taken in conjunction with the accompanying drawings.

DESCRIPTION OF THE PREFERRED EMBODIMENTS

Figure 1:
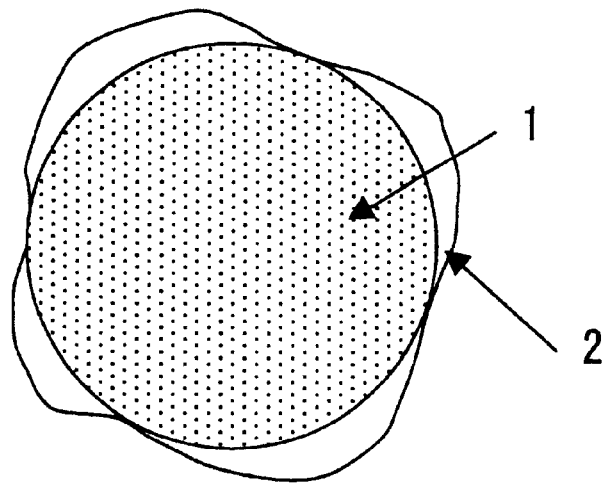
FIG. 1 is a pictorial view showing a nickel hydroxide active material according to an embodiment of this invention.

An explanation will be given of an embodiment in the case where this invention was applied to a nickel-metal hydride(Ni—MH) storage battery.
1. Creation of Nickel Hydroxide Powder
(1) Embodiment While a mixed water solution of nickel sulfate, zinc sulfate and cobalt sulfate, which were mixed so that zinc of 3 mass %, cobalt of 2 mass % are present for the mass of metallic nickel, was being stirred, a water solution of sodium hydroxide was gradually added to the mixed solution. In this state, while the reactive solution was being maintained at pH of 13–14, granulated nickel hydroxide was precipitated. Incidentally, the mass rates of zinc and cobalt were measured by ICP-AES (Inductively Coupled Plasma Atomic Emission Spectroscopy).

A water solution of cobalt sulfate was added to the solution from which the granulated nickel hydroxide was precipitated. In this state, this reactive solution was being maintained at pH of 9–10, cobalt hydroxide was precipitated around a crystalline nucleus of a spherical hydroxide particle containing nickel hydroxide as a main component. Incidentally, in the case of this particle, 10 mass % of cobalt hydroxide was precipitated for the spherical hydroxide particle.

The nickel hydroxide with cobalt hydroxide precipitated on the surface was subjected to alkaline heat treatment in which sodium hydroxide of 25 mass % was sprayed onto the nickel hydroxide for 0.5 hour in an atmosphere of oxygen heated at 100° C.

Through such alkaline treatment, the crystalline structure of the cobalt hydroxide covering the surface of the granulated nickel hydroxide was destroyed. As a result, the crystal structure is disordered, and the oxidation of the cobalt hydroxide is facilitated strongly. Thus, high-order cobalt compound having an average oxidation number of larger than +2 was produced. Accordingly, a granulated nickel hydroxide particle on the surface of which the high-order cobalt compound containing alkaline cations of high conductivity is created unevenly can be obtained.

The nickel hydroxide compound thus obtained was immersed for ten minutes in a hydrochloric acid solution (0.2 mol/L) of 1 little to the nickel hydroxide compound of 100 g so that the high-order cobalt compound containing the alkaline cations was eluded into the hydrochloric acid solution. After the nickel hydroxide particle thus obtained was rinsed by pure water, it was dehydrated and dried, thus creating a nickel hydroxide active material. The nickel hydroxide active material was referred to as the active material a according to the embodiment.

As a result of analysis of the composition of the active material a by the above ICP-AES, it was found that the quantity of cobalt reduced to 8 mass %. In addition, as a result of measurement of the hydrochloric acid solution, it was found that the reduced cobalt was dissolved in the hydrochloric acid solution and nickel was not dissolved therein. Further, as a result of observation of the active material a by a microscope, it was found that the particle surface is smooth.
(2) Comparative Example While a mixed water solution of nickel sulfate, zinc sulfate and cobalt sulfate, which were mixed so that zinc of 3 mass %, cobalt of 2 mass % are present for the mass of metallic nickel, was being stirred, a water solution of sodium hydroxide was gradually added to the mixed solution. In this state, while the reactive solution was being maintained at pH of 13–14, granulated nickel hydroxide was precipitated. Incidentally, the mass rates of zinc and cobalt were measured by the above ICP-AES.

A water solution of cobalt sulfate was added to the solution from which the granulated nickel hydroxide was precipitated. In this state, this reactive solution was being maintained at pH of 9–10, cobalt hydroxide was precipitated around a crystalline nucleus of a spherical hydroxide particle containing nickel hydroxide as a main component. Incidentally, in the case of this particle, 8 mass % of cobalt hydroxide was precipitated for the spherical hydroxide particle.

The nickel hydroxide with cobalt hydroxide precipitated on the surface was subjected to alkaline heat treatment in which sodium hydroxide of 25 mass % was sprayed onto the nickel hydroxide for 0.5 hour in an atmosphere of oxygen heated at 100° C. After the nickel hydroxide particle thus obtained was rinsed by pure water, it was dehydrated and dried, thus creating a nickel hydroxide active material. The nickel hydroxide active material was referred to as the active material x according to the comparative example.

The nickel hydroxide active material thus created is pictorially shown in FIG. 1. As apparent from FIG. 1, in the hydroxide nickel active material according to the embodiment of this invention, a hydroxide nickel particle 1 is covered with a high-order cobalt layer 2 containing alkaline cations formed unevenly so that its surface is partially exposed.

Figure 2:
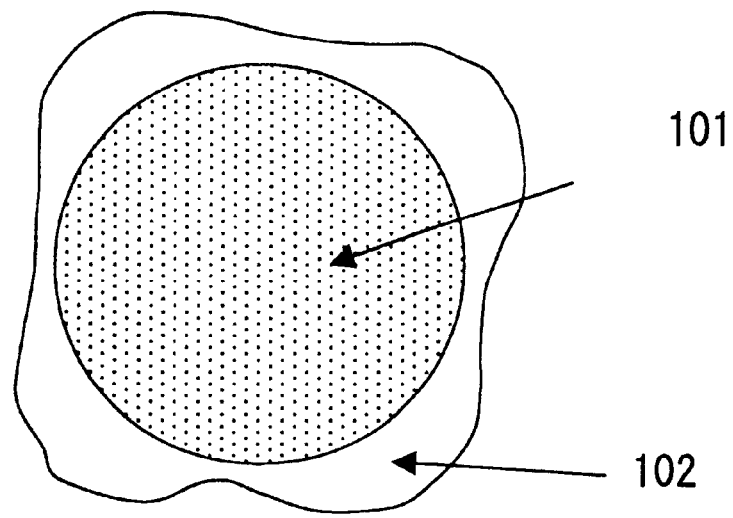
FIG. 2 is a pictorial view showing a conventional nickel hydroxide active material.

For comparison, the conventional nickel hydroxide active material according to the comparative example is pictorially shown in FIG. 2. As apparent from FIG. 2, in the hydroxide nickel active material, the entire surface of a hydroxide nickel particle 101 is covered with a high-order cobalt layer 102.

2. Measurement of Filling Density

Using each of the active materials a according to the embodiment of this invention and the active material x according to the comparative example, 100 mass part of the active material and 50 mass part of a PTFE (polytetrafluoroethylene) dispersion solution by 5 mass % were mixed to create an active material slurry. The active material thus prepared was filled into an electrode body of foaming nickel by 700 g/m². The electrode thus acquired was rolled by a roller-type rolling mill (load of 100 t). At this time, the filling density of the active material was measured as follows. The volume of the electrode body was subtracted from the thickness of the rolled electrode to calculate the mass of the active material to the spatial volume of the electrode body. The measurement result of the filling density for each active material is shown in Table 1. Incidentally, in Table 1, assuming that the filling density of the active material a according to the embodiment of this invention is 100, that of the active material x is represented in a ratio thereto.

TABLE 1

| Kind of Active Material | Filling Density |
| --- | --- |
| Embodiment (a) | 100 |
| Comparative Example (x) | 95 |

As apparent from Table 1, it can seen that the filling density of the active material a was improved in comparison to the active material x according to the comparative example. This is probably attributable to the following reason. As regards the active material x according to the comparative example, when the cobalt compound is precipitated, the high-order cobalt compound is created from the nucleus on the surface of the nickel hydroxide compound so that the uneven shape is formed on the surface of the nickel hydroxide compound, thereby providing a great bulk. On the other hand, as regards the active material a according to the embodiment of this invention, the uneven shape on the surface crated when the cobalt compound was precipitated is eluded in the hydrochloric acid solution so that the particle surface is smoothed, thereby providing a reduced bulk to improve the filling density.

2. Measurement of Filling Density

Using each of the active materials a according to the embodiment of this invention and the active material x according to the comparative example, 100 mass part of the active material and 50 mass part of a PTFE (polytetrafluoroethylene) dispersion solution by 5 mass % were mixed to create an active material slurry. The active material thus prepared was filled into an electrode body of foaming nickel by 700 g/m². The electrode thus acquired was rolled into a prescribed thickness and cut in a shape providing the active material of 5 g. Thus, the nickel positive electrode according to the embodiment of this invention and the nickel positive electrode according to the comparative example were manufactured.

4. Uni-Pole Test (1) Unit Active Material Capacity

Each of the nickel positive electrode A (Embodiment) and nickel positive electrode X (Comparative Example) and a nickel plate serving as an opposite electrode to the positive electrode were housed in an opened electric bath. Further, a sodium hydroxide solution by 25 mass % was injected into the bath, thereby manufacturing an opened type simple cell. The simple cell thus manufactured was charged for 16 hours with a charging current of 125 mA (0.1 C.) at room temperature. Thereafter, it was discharged with the discharging current of 750 mA (1/3 C.) until its terminating voltage became 1.0 V, and the discharging capacity was acquired on the basis of the discharging hour. After the test, the active material was removed from the nickel positive electrode A and nickel positive electrode X to measure the quantity of the active material. The discharging capacity (unit active material capacity) per the active material of 1 g was calculated. The result is shown in Table 2. Incidentally, in Table 2, assuming that the unit active material capacity of the nickel positive electrode A according to the embodiment of this invention is 100, that of the nickel positive electrode X is represented in a ratio thereto.

(2) High Rate Discharging Capacity

Next, the simple cell manufactured in the manner as described above was charged for 16 hours with a charging current of 125 mA (0.1 C.) at room temperature. Thereafter, it was discharged with the discharging current of 5 A (4 C.) until its terminating voltage became 1.0 V, and the high rate discharging capacity was acquired on the basis of the discharging hour. After the test, the active material was removed from the nickel positive electrode A and nickel positive electrode X to measure the quantity of the active material. The unit active material high rate discharging capacity per the active material of 1 g was calculated.

Subsequently, its ratio to the unit active material capacity acquired previously was calculated as a high rate discharging capacity. The result is shown in Table 2. Incidentally, in Table 2, assuming that the high rate discharging capacity of the nickel positive electrode A according to the embodiment of this invention is 100, that of the nickel positive electrode X is represented in a ratio thereto.

TABLE 2

| Kind of Nickel Positive Electrode | Unit Active-Material Capacity | High rate Discharging Capacity |
| --- | --- | --- |
| Embodiment (A) | 100 | 100 |
| Comparative Example (X) | 100 | 75 |

As apparent from Table 2, the unit active material capacity is substantially equal in both the nickel positive electrode A (Embodiment) and nickel positive electrode X (Comparative Example). This means that the discharging capacity during normal discharging is unvaried between when the high-order cobalt compound was created unevenly on the surface of the nickel hydroxide compound as in the embodiment and when it was created uniformly on the surface of the nickel hydroxide compound as in the comparative example.

On the other hand, it can be seen that the high rate discharging capacity of the nickel hydroxide positive electrode A according to the embodiment has greatly improved as compared with that of the nickel hydroxide positive electrode X according to the comparative example. This is probably based on the following reason. In the nickel hydroxide positive electrode X according to the comparative example, the surface of the nickel hydroxide active material x used therein is uniformly covered with the high-order cobalt compound so that the rate of using the active material during the high rate discharging decreases and the high rate discharging capacity also decreases.

On the other hand, in the nickel hydroxide positive electrode A according to the embodiment, a part of the high-order cobalt compound on the surface of the nickel hydroxide active material a is eluted into the hydrochloric acid solution. As a result, the nickel hydroxide active material which participates in the reaction is brought into direct contact with the electrolyte. Accordingly, the rate of using the active material during the high rate discharging is improved, which improves the high rate discharging capacity.

As described above, in this invention, since only a part of the surface of the nickel hydroxide is covered with the cobalt compound, the nickel hydroxide not covered with the cobalt compound is brought into direct contact with the electrolyte, thus improving the high rate discharging characteristic. Since a part of the surface of the nickel hydroxide is covered with the high-order cobalt compound containing alkaline cations, the high-order cobalt compound with high conductivity produces a highly conductive network within the positive electrode so that the rate of using the active material is improved. Accordingly, a high capacity storage battery can be obtained.

Additionally, in the embodiment described above, in order to elute the high-order cobalt compound containing the alkaline cations into the hydrochloric acid solution, the nickel hydroxide compound was immersed within the hydrochloric acid solution of the 0.2 mol/L for ten minutes. However, the concentration and the immersing time of the hydrochloric acid solution for immersion can be selected in combination as necessary. Further, the acid solution to be employed should not be limited to hydrochloric acid, but an acid solution such as sulfuric acid or acetic acid solution may be employed as necessary. Furthermore, by not only immersing the nickel hydroxide in the acid solution but also spraying the acid solution onto the nickel hydroxide solution, the high-order cobalt compound may be brought into contact with the acid solution.

What is claimed is:

1. An alkaline storage battery including a positive electrode active material containing nickel hydroxide as a main component, wherein said nickel hydroxide is a nickel hydroxide compound with a cobalt compound having an average oxidation number of larger than +2 and containing alkaline cations wherein said cobalt compound is unevenly disposed on a surface of a nickel hydroxide article so that its surface is exposed.

2. An alkaline storage battery according to claim 1, wherein said positive electrode active material as well as a binder is applied to or filled in a collector.

3. An alkaline storage battery according to claim 1, wherein said alkaline cations are sodium cations.

4. An alkaline storage battery according to claim 1, wherein said nickel hydroxide compound is a granulated nickel hydroxide particle with its surface unevenly covered with a cobalt compound having an average oxidation number of larger than +2 and containing alkaline cations.

5. A method of manufacturing an alkaline storage battery including a positive electrode active material containing nickel hydroxide as a main component, said method comprising the steps of:

(a) covering a surface of a granulated nickel hydroxide compound containing said nickel hydroxide as a main component with a cobalt compound;

(b) alkaline-heat-treating said nickel hydroxide compound covered with said cobalt compound so that said cobalt compound is changed into a high-order cobalt compound containing alkaline cations; and (c) contacting or immersing the nickel hydroxide compound covered with the cobalt compound having an average oxidation number of larger than +2 and containing said alkaline cations in an acid water solution so that a part of said high-order cobalt compound is dissolved leaving the cobalt compound unevenly disposed on a surface of a nickel hydroxide particle so that its surface is partially exposed.

6. A method of manufacturing an alkaline storage battery according to claim 5, wherein said covering step (a) comprises adding a water solution containing cobalt ions into a solution with granulated hydroxide nickel precipitated so that cobalt hydroxide is precipitated around a crystalline nucleus of a spherical hydroxide particle containing nickel hydroxide as a main component.

7. A method of manufacturing an alkaline storage battery according to claim 6, wherein said water solution containing the cobalt ions is a water solution of cobalt sulfate.

8. A method of manufacturing an alkaline storage battery according to claim 7, wherein said covering step (a) comprises controlling pH9–10 in the solution so as to precipitate the cobalt hydroxide.

9. A method of manufacturing an alkaline storage battery according to claim 5, wherein said alkaline heat treatment step (b) comprises spraying an alkaline solution onto the nickel hydroxide compound covered with the cobalt compound within an atmosphere of oxygen.

10. A method of manufacturing an alkaline storage battery according to claim 9, wherein said alkaline-heat-treatment step (b) is carried out at a temperature ranging from 50□C. to 110□C.

11. A method of manufacturing an alkaline storage battery according to claim 9, wherein said alkaline solution contains sodium hydroxide.

12. A method of manufacturing an alkaline storage battery according to claim 5, wherein said acid water solution in step (c) is selected from the group consisting of hydrochloric acid solution, sulfuric acid solution and acetic acid solution.

* * * * *